(12) United States Patent
Park (10) Patent No.: US 7,884,915 B2
(45) Date of Patent: Feb. 8, 2011

(54) METHOD OF MANUFACTURING LIQUID CRYSTAL DISPLAY DEVICE

(75) Inventor: Kwang Seop Park, Gumi-si (KR)

(73) Assignee: LG Display Co., Ltd., Seoul (KR)

( * ) Notice: Subject to any disclaimer, the term of this patent is extended or adjusted under 35 U.S.C. 154(b) by 246 days.

(21) Appl. No.: 11/723,159

(22) Filed: Mar. 16, 2007

(65) Prior Publication Data

US 2007/0178797 A1    Aug. 2, 2007

Related U.S. Application Data

(62) Division of application No. 10/703,585, filed on Nov. 10, 2003, now Pat. No. 7,214,115.

(30) Foreign Application Priority Data

Nov. 21, 2002    (KR)    ............. 10-2002-0072601

(51) Int. Cl.
    *G02F 1/1333*    (2006.01)
(52) U.S. Cl. ............... 349/153; 349/149; 349/152
(58) Field of Classification Search ............... 349/153, 349/149, 152, 155–157
    See application file for complete search history.

(56) References Cited

U.S. PATENT DOCUMENTS

| | | | |
|---|---|---|---|
| 5,517,344 A * | 5/1996 | Hu et al. ............... | 349/153 |
| 6,486,936 B1 | 11/2002 | Sugimoto | |
| 6,542,215 B2 | 4/2003 | Lee et al. | |
| 6,567,147 B1 * | 5/2003 | Hirakata ............... | 349/153 |
| 6,967,703 B2 * | 11/2005 | Nam et al. ............... | 349/153 |
| 2002/0027635 A1 | 3/2002 | Sakamaki et al. | |
| 2003/0086050 A1 * | 5/2003 | Lee et al. ............... | 349/153 |
| 2005/0041194 A1 * | 2/2005 | Lee et al. ............... | 349/155 |

* cited by examiner

*Primary Examiner*—Bumsuk Won
*Assistant Examiner*—Nathaniel J Lee
(74) *Attorney, Agent, or Firm*—McKenna Long & Aldridge LLP (57) ABSTRACT

A method of manufacturing an LCD device includes forming a gate bus line, a gate insulating layer, an active layer, and a source/drain metal layer on a transparent insulating substrate; etching the source/drain metal layer and active layer to form a source/drain electrode and a channel layer while forming a metal protection pattern in a peripheral region of the transparent insulating substrate; forming a protection layer and a pixel electrode on the insulating substrate; forming a main seal line at an interior region of the array substrate, forming a first auxiliary seal line between the metal protection pattern and the main seal line, and forming second and third auxiliary seal lines; and attaching a color filter substrate to the array substrate via the main seal line.

7 Claims, 6 Drawing Sheets

METHOD OF MANUFACTURING LIQUID CRYSTAL DISPLAY DEVICE

This application is a Divisional of prior application Ser. No. 10/703,585, filed Nov. 10, 2003 now U.S. Pat. No. 7,214,115, which claims the benefit of Korean Patent Application No. 2002-0072601 filed in Korea on Nov. 21, 2002, which is hereby incorporated by reference in its entirety as if fully set forth herein.

BACKGROUND OF THE INVENTION

1. Field of the Invention

The present invention relates to methods of manufacturing liquid crystal display (LCD) devices, and more particularly to a method of manufacturing LCD devices having an array substrate uniformly spaced apart from a color filter substrate to define a uniform cell gap.

2. Description of the Related Art

As the development of diverse types of information devices proliferate and become available to consumers, demands on the types of displays used by information devices have increased. Cathode Ray Tubes (CRTs) have been widely used within various information devices due to their functionality and low cost. However, CRTs are not easily made portable nor miniaturized. Due to their beneficial characteristics such as excellent picture quality (e.g., high resolution and luminance), light weight, thin profile, large display area, and low power consumption, LCD devices are commonly used in applications previously dominated by Cathode Ray Tubes (CRTs).

Generally, LCD devices include an array substrate attached to, and spaced apart a predetermined distance from, a color filter substrate to create a cell gap into which liquid crystal material is injected. The array substrate includes a plurality of thin film transistors while the color filter substrate includes a plurality of red (R), green (G), and blue (B) color filters.

Having described the general structure of LCD devices, a method by which LCD devices are generally manufactured will now be described in greater detail.

In fabricating array substrates, a metal layer is deposited onto a transparent glass substrate. Subsequently, in a first masking process, the deposited metal layer is etched to form a gate bus line and a gate electrode. Next, a gate insulating layer, an amorphous silicon layer, and a doped amorphous silicon layer are deposited on the transparent glass substrate supporting the gate bus line and gate electrode. In a second masking process, the deposited gate insulating, amorphous silicon, and doped amorphous silicon layer are patterned to form a channel layer. Next, a source/drain metal layer is deposited on the substrate supporting the channel layer. In a third masking process, the source/drain metal layer is etched to form source/drain electrodes and a data bus line. Next, a protection layer is deposited over the substrate supporting the source/drain electrodes and data bus line. In a fourth masking process, the deposited protection layer is patterned to protect underlying devices and form contact holes. Next, an ITO transparent metal layer is deposited over the substrate supporting the protection layer. In a fifth masking process, the ITO transparent metal layer is etched to form a pixel electrode.

By applying manufacturing techniques methods such as the techniques described above, array substrates can be manufactured using five to eight masking processes. However, as the number of masking processes used to manufacture array substrates increase, the cost associated in manufacturing LCD devices increases. Accordingly, much research has been concentrated on reducing the number of masking processes used in manufacturing array substrates. Currently, for example, array substrates may be manufactured in as few as four masking processes, wherein the channel layer and the source/drain electrodes are patterned in the same masking process.

After the being manufactured, the array substrate is attached to a color filter substrate via a UV-curable sealant material patterned on either the array or color filter substrate. The patterned sealant material generally includes a seal line formed within an interior region of the array substrate and defining a liquid crystal injection hole, enabling liquid crystal material to be injected into the cell gap between the attached array and color filter substrates.

Generally, seal lines are formed on substrates using screen printing methods, dispense printing methods, and the like. According to the screen printing methods, seal lines are formed by applying a roller coated with sealant material against a screen (e.g., a mask) arranged over the substrate. According to the dispense printing methods, seal lines are formed by disposing sealant material within a tube and squeezing the tube above the substrate.

To prevent injected liquid crystal material from seeping out of the cell gap, and to ensure maximized attachment to the color filter substrate, auxiliary seal lines are generally formed in peripheral regions of the array substrate. To maintain a substantially uniform cell gap, spacers can be distributed on the color filter substrate when seal lines are formed on the array substrate. After attaching the array and color filter substrates, the seal lines are cured (e.g., hardened) in the presence of ultraviolet light.

Figure 1:
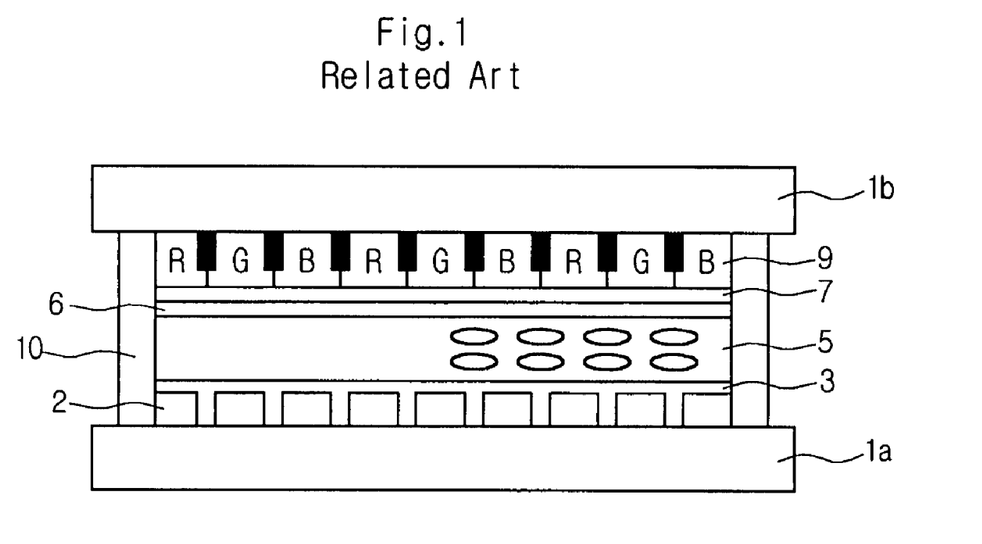
FIG. 1 illustrates a sectional view of a related art LCD device.

FIG. 1 illustrates a sectional view of a related art LCD device.

Referring to FIG. 1, the array substrate includes a lower substrate 1a, formed of a transparent insulating material that supports a plurality of gate bus lines, a plurality of data bus lines crossing the plurality of gate bus lines, a plurality of pixel regions defined by the crossings of the gate and data bus lines, a plurality of pixel electrodes 2 formed of transparent metal and arranged in a matrix pattern within corresponding ones of the pixel regions, and a first protection layer 3 formed on the lower substrate 1a. The color filter substrate includes a transparent upper substrate 1b, formed of a transparent insulating material that supports a black matrix layer, red (R), green (G), and (B) color filters 9 arranged on the black matrix layer, a second protection layer 7 formed on the R, G, and B color filters 9, and a common electrode 6 formed on the second protection layer 7. A seal line 10 is formed between the array and color filter substrates to seal a liquid crystal layer 5 interposed between the array and color filter substrates and within the cell gap. Ultraviolet light is used to cure the seal line 10, wherein the two substrates are attached to each other by the cured seal line 10.

Figure 2:
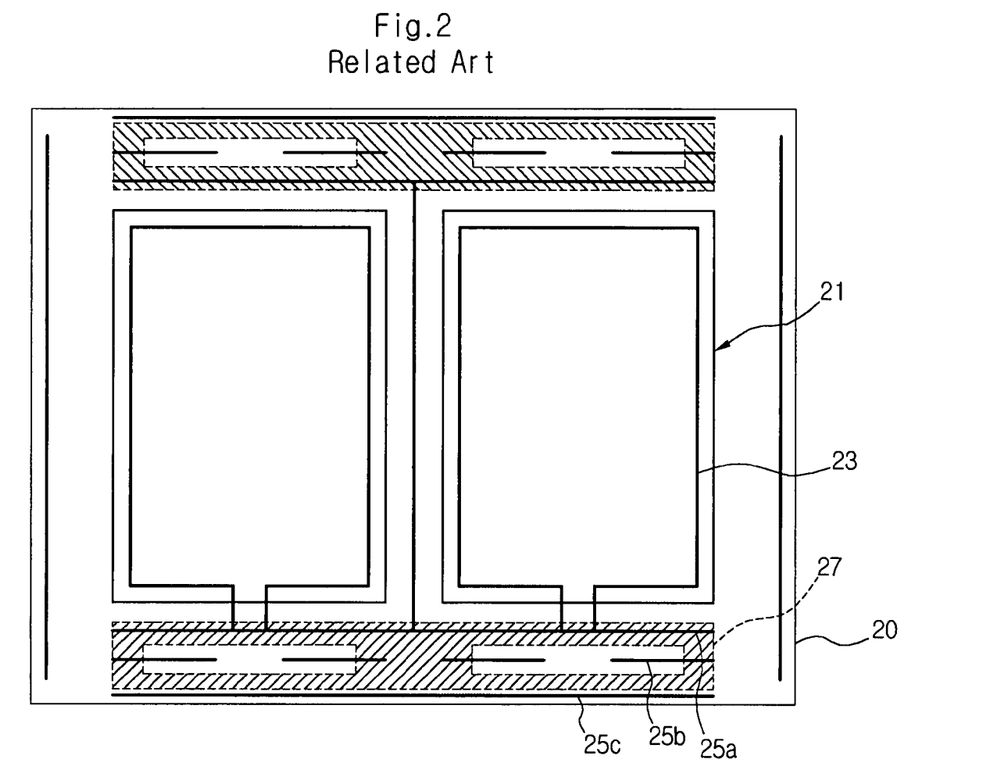
FIG. 2 schematically illustrates related art seal lines formed on a related art array substrate.

FIG. 2 schematically illustrates related art seal lines formed on a related art array substrate.

Referring to FIG. 2, each array substrate 21 is manufactured according to the aforementioned four-mask process and includes a plurality of pixel regions (not shown) provided on a transparent insulating substrate 20 and pad regions (not shown) where signals are applied to gate and data bus lines defining the pixel regions. Depending on the size of the transparent insulating substrate 20, four to six array substrates 21 of predetermined sizes can be formed on the same transparent insulating substrate 20.

As mentioned above, patterned sealant material facilitates the attachment of an array substrate 21 to a corresponding color filter substrate. Accordingly, the sealant pattern on each array substrate 21 includes a main seal line 23 formed at an interior region of the array substrate 21 and defining a liquid crystal injection hole, and three auxiliary seal lines 25a, 25b, and 25c and auxiliary seal lines 25' formed at opposing peripheral regions of the array substrate 21 including a region near the liquid crystal injection hole. The auxiliary seal lines 25a, 25b, 25c, and 25' prevent the propagation of cracks within the transparent insulating substrate 21, that may be generated during a subsequent scribing process, from peripheral regions of the transparent insulating substrate 20 into the interior region of the array substrate 21.

Related art array substrates such as those shown in FIGS. 1 and 2 generally include a metal protection pattern 27 formed within the peripheral regions of the array substrate 21 where the auxiliary seal lines 25a, 25b, and 25c are formed. The metal protection pattern 27 prevents corner regions of the array substrate 21 from becoming damaged during the masking process used to form the source/drain electrode and the channel layer. Accordingly, the metal protection pattern 27 is patterned in the same masking process as when the source/drain electrode is formed.

As shown in FIG. 2, the first auxiliary seal line 25a completely overlaps the metal protection pattern 27, the second auxiliary seal line 25b partially overlaps the metal protection pattern 27, and the third auxiliary seal line 25c does not overlap the metal protection pattern 27.

Figure 3:
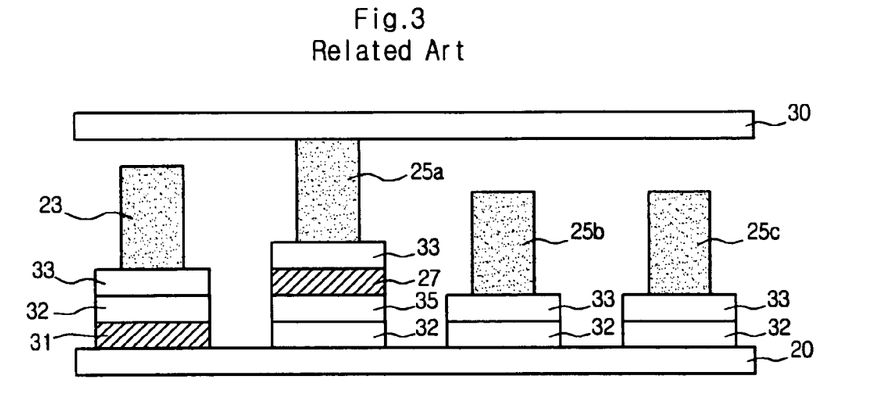
FIG. 3 illustrates a cross sectional view of the cell gap maintained by the related art seal lines shown in FIG. 2.

FIG. 3 illustrates a cross sectional view of the cell gap maintained by the related art array substrate and seal lines shown in FIG. 2.

Referring to FIG. 3, the main seal line 23, having a predetermined thickness, is formed over a first layered structure including a 2500 Å thick gate electrode metal layer 31 formed on the transparent insulating substrate 20, a 4000 Å thick gate insulating layer 32 formed on the gate electrode metal layer 31, and a 2000 Å thick protection layer 33 formed on the gate insulating layer 32, wherein the main seal line 23 is formed on the protection layer 33. The first layered structure has a step height of 8500 Å above the transparent insulating substrate 20.

The first auxiliary seal line 25a, having the predetermined thickness, is formed over a second layered structure including the 4000 Å thick gate insulating layer 32 formed on the transparent insulating substrate 20, a 2000 Å thick active layer 35 formed on the gate insulating layer 32, the 2000 Å thick metal protection pattern 27 formed on the active layer 35, and the 2000 Å thick protection layer 33 formed on the metal protection pattern 27, wherein the first auxiliary seal line 25a is formed on the protection layer 33. The second layered structure has a step height of 10000 Å above the transparent insulating substrate 20.

The second and third auxiliary seal lines 25b and 25c, respectively, each having the predetermined thickness, are formed over third layered structures including the 4000 Å thick gate insulating layer 32 formed on the transparent insulating substrate 20 and the 2000 Å thick protection layer 33 formed on the gate insulating layer 32, wherein the second and third auxiliary seal lines 25b and 25c, respectively, are formed on the protection layer 33. The third layered structures both have step heights of 6000 Å above the transparent insulating substrate 20.

After the main seal line 23 and the first through third auxiliary seal lines 25a, 25b, and 25c are formed on the array substrate 21, the color filter substrate 30 is attached to the array substrate 21 to form a liquid crystal cell. As mentioned above, when array substrates of LCD devices are manufactured according to the four-mask manufacturing process, the metal protection pattern 27 is formed within the peripheral regions of the liquid crystal injection hole where the auxiliary seal lines 25a, 25b, and 25c are formed. Due to the presence of the metal protection pattern 27, the step height of the second layered structure is greater than the step height of the first or third layered structures. Accordingly, the color filter substrate 30 attaches to the array substrate 21 via the first auxiliary seal line 25a only.

Since the height of the first auxiliary seal line 25a formed in a peripheral region of the array substrate 21, near the liquid crystal injection hole, is 1500 Å greater than the height of the main seal line 23, formed at the interior region of the array substrate 21 and defining the liquid crystal injection hole, a uniform cell gap between the array and color filter substrates cannot be adequately maintained. Further, since the first auxiliary seal line 25a is elevationally higher than the main seal line 23, liquid crystal material may seep out of the liquid crystal cell substrate while being injected. Lastly, spots may deleteriously be generated within the main seal line 23.

SUMMARY OF THE INVENTION

Accordingly, the present invention is directed to methods of manufacturing LCD devices that substantially obviate one or more problems due to limitations and disadvantages of the related art.

One advantage of the present invention provides a method of manufacturing LCD devices, wherein a main seal line and an auxiliary seal line are spaced apart from a substrate by the same distance and wherein a cell gap uniform is uniformly maintained.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described, the method of manufacturing a liquid crystal display (LCD) device may, for example, include forming an array substrate by sequentially forming a gate bus line, a gate insulating layer, an active layer, and a source/drain metal layer on a transparent insulating substrate; sequentially wet etching and dry etching the transparent insulating substrate to form a source/drain electrode and a channel layer within a display region of the transparent insulating substrate and a metal protection pattern in a peripheral region of the transparent insulating substrate; and forming a protection layer and a pixel electrode on the transparent insulating substrate; forming a main seal line at an interior region of the array substrate, the main seal line defining a liquid crystal injection hole; forming a first auxiliary seal line in a peripheral region of the array substrate between the metal protection pattern and the main seal line; forming a second auxiliary seal line in the peripheral region of the array substrate; forming a third auxiliary seal line in the peripheral region of the array substrate, wherein the third auxiliary seal line is spaced apart from the second auxiliary seal line; and attaching a color filter substrate to the array substrate.

In one aspect of the present invention, the main seal line may be formed over a first layered structure, wherein the first layered structure may, for example, include the gate bus line, the gate insulating layer, and the protection layer; and the first auxiliary seal line may be formed over a second layered structure, wherein the second layered structure may, for example, include the protection layer and the gate insulating layer, wherein the main seal line may be elevationally higher than the first auxiliary seal line, the second auxiliary seal line, and the third auxiliary seal line with respect to the transparent insulating substrate.

According to principles of the present invention, another method of manufacturing a liquid crystal display device may, for example, include forming an array substrate by sequentially forming a gate bus line and a gate electrode on a transparent insulating substrate; forming a gate electrode metal layer in a peripheral region of the transparent insulating substrate; sequentially forming a gate insulating layer, an active layer, and a source/drain metal layer on the transparent insulating substrate having the gate bus line formed thereon; sequentially performing a wet etching and a dry etching on the transparent insulating substrate to form a source/drain electrode and a channel layer within a display region of the transparent insulating substrate; and forming a metal protection pattern in a peripheral region of the transparent insulating substrate; and forming a protection layer and a pixel electrode on the transparent insulating substrate; forming a main seal line at an interior region of the array substrate, the main seal line defining a liquid crystal injection hole, forming a first auxiliary seal line in a peripheral region of the array substrate between the metal protection pattern and the main seal line, wherein the first auxiliary seal line overlaps the gate electrode metal layer formed in the peripheral region of the array substrate; forming a second auxiliary seal line in the peripheral region of the array substrate; forming a third auxiliary seal line in the peripheral region of the array substrate, wherein the third auxiliary seal line is spaced apart from the second auxiliary seal line; and attaching a color filter substrate to the array substrate.

In one aspect of the present invention, the main seal line may be formed over a first layered structure, wherein the first layered structure may, for example, include the gate bus line, the gate insulating layer, and the protection layer; and the first auxiliary seal line may be formed over a second layered structure, wherein the second layered structure may, for example, include the protection layer, the gate insulating layer, and the gate electrode metal layer.

In another aspect of the present invention, the main seal line may be spaced apart from the transparent insulating substrate by a first distance and the first auxiliary seal line may be spaced apart from the transparent insulating substrate by a second distance, wherein the first distance is greater than the second distance.

In still another aspect of the present invention, the main seal line may be spaced apart from the transparent insulating substrate by a first distance and the first auxiliary seal line may be spaced apart from the transparent insulating substrate by a second distance, wherein the first distance is substantially equal to the second distance.

In yet another aspect of the present invention, the main seal line and the first to third auxiliary seal lines may be substantially the same thickness.

By forming (e.g., screen printing, dispense printing, etc.) the main seal line and the first auxiliary seal line such that the distance by which the main seal line is spaced apart from the transparent insulating substrate is equal to or greater than the by the distance by which the first auxiliary seal line is spaced apart from the transparent insulating substrate, a substantially uniform cell gap may be maintained between an attached color filter substrate and the array substrate.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

In the drawings.

DETAILED DESCRIPTION OF THE ILLUSTRATED EMBODIMENTS

Reference will now be made in detail to embodiments of the present invention, examples of which are illustrated in the accompanying drawings. Wherever possible, the same reference numbers will be used throughout the drawings to refer to the same or like parts.

Figure 4:
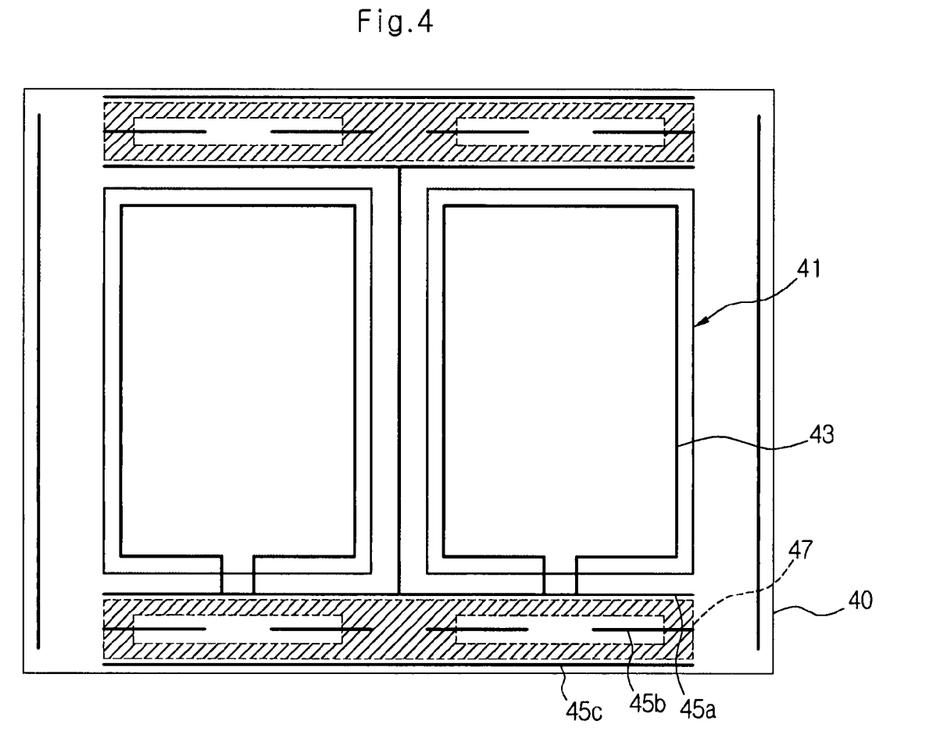
FIG. 4 schematically illustrates seal lines formed on an array substrate in accordance with principles of one aspect of the present invention.
Figure 5:
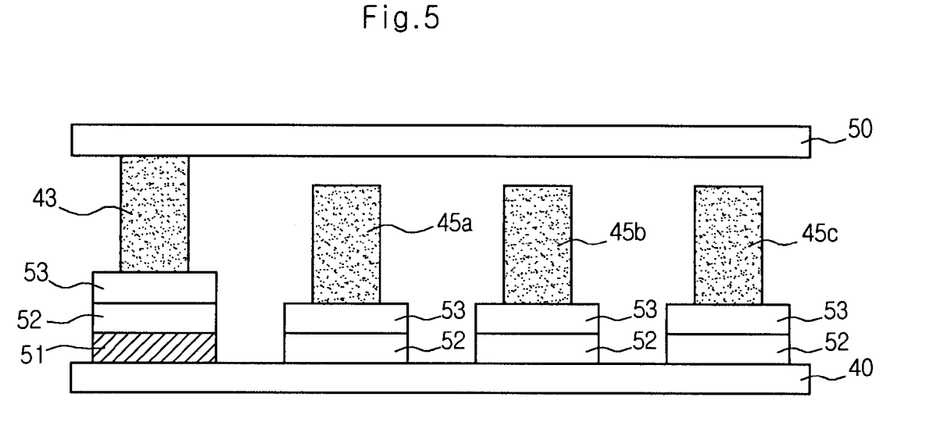
FIG. 5 illustrates a cross sectional view of the cell gap maintained by the seal lines shown in FIG. 4.

FIG. 4 schematically illustrates seal lines formed on an array substrate in accordance with principles of one aspect of the present invention. FIG. 5 illustrates a cross sectional view of the cell gap maintained by the seal lines shown in FIG. 4.

Referring to FIG. 4, an array substrate 41 may, for example, include a transparent insulating substrate 40. In one aspect of the present invention, the array substrate 41 may, for example, be fabricated by forming a gate electrode metal layer (not shown), patterning the gate electrode metal layer to form a plurality of gate bus lines (not shown) within a display region of the array substrate 41, forming a gate insulating layer (not shown) over the plurality of gate bus lines, forming an active layer (not shown) over the gate insulating layer, and forming a source/drain metal layer (not shown) over the active layer. Subsequently, source/drain electrodes and a channel layer may be formed by, for example, applying sequential wet and dry etching processes to the source/drain metal layer and active layer.

A metal protection pattern 47 may be formed in opposing peripheral regions of the lower transparent substrate 40. In one aspect of the present invention, the metal protection pattern 47 may be formed simultaneously with the formation of the source/drain electrodes. In another aspect of the present invention, the metal protection pattern 47 may be formed on the transparent insulating substrate 40 simultaneously with the formation of the source/drain metal layer. In still another aspect of the present invention, the metal protection pattern 47 may be the same material as the source/drain metal layer. In yet another aspect of the present invention, the metal protection pattern 47 may be the same layer as the source/drain metal layer.

Subsequently, a protection layer (not shown) and a pixel electrode (not shown) may be formed over the transparent substrate 40 to complete formation of an array substrate 41.

According to the principles of the present invention, the array substrate 41 described above may be attached to a color filter substrate (not shown) via a sealant material pattern comprising a plurality of seal lines. In one aspect of the present invention, the plurality of seal lines may, for example, include a main seal line 43 formed at an interior region of the array substrate 41 and defining a liquid crystal injection hole and a plurality of auxiliary seal lines formed at peripheral regions of the array substrate 41. In another aspect of the present invention, the main seal line 43 may be provided in a closed pattern, whereby liquid crystal is not injected into a subsequently formed cell gap, but is dispensed directly onto either the array substrate or onto the color filter substrate before a subsequent attaching process, as will be described in greater detail below. In one aspect of the present invention, the plurality of auxiliary seal lines may, for example, include first, second, and third auxiliary seal lines 45a, 45b, and 45c, respectively, and auxiliary seal lines 45' formed at opposing peripheral regions of the array substrate 41. In another aspect of the present invention, the first auxiliary seal line 45a may be arranged in a first peripheral area located between the main seal line 43 and the metal protection pattern 47.

As shown in FIG. 4, the first through third auxiliary seal lines 45a-c do not overlap the metal protection pattern 47.

After the main seal line 43 and the first to third auxiliary seal lines 45a, 45b, and 45c are formed on the lower transparent substrate 40, a color filter substrate (not shown) may be attached to the array substrate 41 via the main seal line 43.

FIG. 5 illustrates a cross sectional view of the cell gap maintained by the seal lines shown in FIG. 4.

Referring to FIG. 5, the main seal line 43, having a predetermined thickness, may be formed over a first layered structure including, for example, a portion of the patterned gate electrode metal layer 51 arranged within the interior region of the array substrate, the gate insulating layer 52, and the protection layer 53 formed on the lower transparent substrate 40. In one aspect of the present invention, the gate electrode metal layer 51 may be about 2500 Å thick, the gate insulating layer 52 may be about 4000 Å thick, and the protection layer 53 may be about 2000 Å thick. Accordingly, the main seal line 43 may be spaced apart from the lower transparent substrate 40 by a first distance of about 8500 Å.

Moreover, the first auxiliary seal line 45a, having the predetermined thickness, may be formed over a second layered structure including, for example, the gate insulating layer 52 formed on the transparent insulating substrate 40 and the protection layer 53 formed on the gate insulating layer 52. Accordingly, the first auxiliary seal line 45a may, for example, may be spaced apart from the lower transparent substrate 40 by a second distance of about 6000 Å.

Further, the second and third auxiliary seal lines 45b and 45c, respectively, each having the predetermined thickness, may be formed over the gate insulating layer 52 formed on the transparent insulating substrate 40 and the protection layer 53 formed on the gate insulating layer 52. Accordingly, the second and third auxiliary seal lines 45b and 45c, respectively, may, for example, may be spaced apart from the lower transparent substrate 40 by a third distance of about 6000 Å.

After the main seal line 43 and the first through third auxiliary seal lines 45a, 45b, and 45c are formed on the array substrate 41, the color filter substrate 50 may be attached to the array substrate 41 to form a liquid crystal cell. As mentioned above, because the first distance is about 8500 Å while the second distance is only about 6000 Å, the color filter substrate 50 may be attached to the array substrate 41 via the main seal line 43. Accordingly, the main seal line 43 may be used to maintain a substantially uniform cell gap between the attached array and color filter substrates 41 and 50, respectively. Moreover, since the main seal line 43 is elevationally higher than any auxiliary seal line and actually contacts the lower color filter substrate, the deleterious generation of spots discussed above with respect to FIGS. 2 and 3, due to liquid crystal injection, may be substantially prevented.

Figure 6:
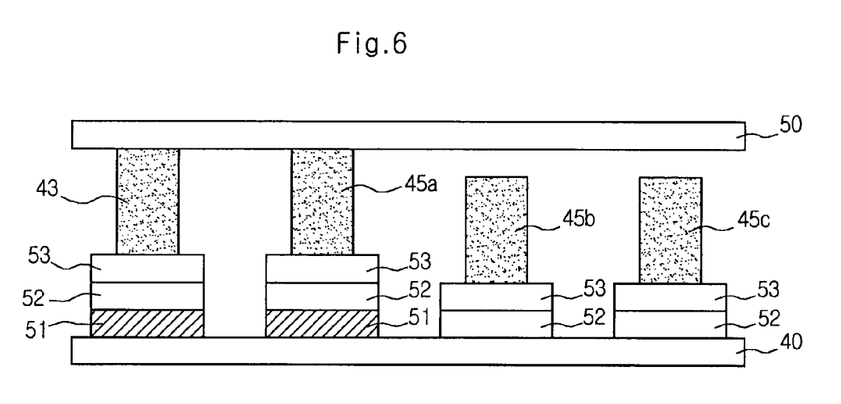
FIG. 6 illustrates a cross sectional view of the cell gap maintained by the seal lines formed on an array substrate in accordance with principles of another aspect of the present invention.

FIG. 6 illustrates a cross sectional view of the cell gap maintained by the seal lines formed on an array substrate in accordance with principles of another aspect of the present invention.

Referring to FIG. 6, the array substrate 41 according to the principles of the present invention may be formed on a transparent insulating substrate 40 by, for example, forming the gate electrode metal layer 51, patterning (e.g., etching) the gate electrode layer to form the plurality of gate bus lines (not shown) within the display region of the array substrate 41, wherein a remaining portion of the gate electrode metal layer 51' exists in opposing peripheral portions of the array substrate 41; forming the gate insulating layer 52 over the gate bus lines, forming an active layer (not shown) over the gate insulating layer, and forming a source/drain metal layer (not shown) over the active layer. Subsequently, source/drain electrodes and a channel layer may be formed by, for example, applying sequential wet and dry etching processes to the source/drain metal layer and active layer.

A metal protection pattern, substantially the same as the metal protection pattern described above with reference to FIG. 4, may be formed in the opposing peripheral regions of the lower transparent substrate 40.

Subsequently, a protection layer 53 and a pixel electrode (not shown) may be formed over the transparent substrate 40 to complete formation of the array substrate 41.

As shown in FIG. 6, the gate electrode metal layer 51 may be patterned to form gate bus lines within the display region of the array substrate 41, as well as within the interior region of the array substrate. Moreover, the gate electrode metal layer 51 may be patterned so as to leave a remaining portion 51' arranged in regions of the transparent insulating substrate 40 where a first auxiliary seal line 45a is to be formed.

According to the principles of the present invention, the array substrate 41 described above may be attached to a color filter substrate (not shown) via a sealant material pattern comprising a plurality of seal lines. In one aspect of the present invention, the plurality of seal lines may, for example, include a main seal line 43 formed at an interior region of the array substrate 41 and defining a liquid crystal injection hole and a plurality of auxiliary seal lines formed at peripheral regions of the array substrate 41. In another aspect of the present invention, the main seal line 43 may be provided in a closed pattern, whereby liquid crystal is not injected into a subsequently formed cell gap, but is dispensed directly onto either the array substrate or onto the color filter substrate before a subsequent attaching process, as will be described in greater detail below. In one aspect of the present invention, the plurality of auxiliary seal lines may, for example, include first, second, and third auxiliary seal lines 45a, 45b, and 45c, respectively, formed at opposing peripheral regions of the array substrate 41. In another aspect of the present invention, the first auxiliary seal line 45a may be arranged between the main seal line 43 and the metal protection pattern. After the main seal line 43 and the first to third auxiliary seal lines 45a, 45b, and 45c are formed on the lower transparent substrate 40, a color filter substrate (not shown) may be attached to the array substrate 41 via the main seal line 43 and the first auxiliary seal line 45a. As similarly discussed above with respect to FIG. 4, the first through third auxiliary seal lines 45a-c may be formed so to not overlap the metal protection pattern.

According to the principles of the present invention, the main seal line 43, having a predetermined thickness, may be formed over a first layered structure including, for example, a portion of the patterned gate electrode metal layer 51 arranged within the interior region of the array substrate, the gate insulating layer 52, and the protection layer 53 formed on the lower transparent substrate 40. In one aspect of the present invention, the gate electrode metal layer 51 may be about 2500 Å thick, the gate insulating layer 52 may be about 4000 Å thick, and the protection layer 53 may be about 2000 Å thick. Accordingly, the main seal line 43 may be spaced apart from the lower transparent substrate 40 by a first distance of about 8500 Å.

Moreover, the first auxiliary seal line 45a, having the predetermined thickness, may be formed over a second layered structure including, for example, the remaining portions of the gate electrode metal layer 51', the gate insulating layer 52, and the protection layer 53 formed on the lower transparent substrate 40. In one aspect of the present invention, the gate electrode metal layer 51 may be about 2500 Å thick, the gate insulating layer 52 may be about 4000 Å thick, and the protection layer 53 may be about 2000 Å thick. Accordingly, the first auxiliary seal line 45a may, for example, may be spaced apart from the lower transparent substrate 40 by a second distance of about 6000 Å.

Further, the second and third auxiliary seal lines 45b and 45c, respectively, each having the predetermined thickness, may be formed over the gate insulating layer 52 formed on the transparent insulating substrate 40 and the protection layer 53 formed on the gate insulating layer 52. Accordingly, the second and third auxiliary seal lines 45b and 45c, respectively, may, for example, may be spaced apart from the lower transparent substrate 40 by a third distance of about 6000 Å.

According to the principles of the present invention as illustrated in FIG. 6, both the main seal line 43, formed at the interior portion of the array substrate 41, and the first auxiliary seal line 45a, formed at peripheral portions of the array substrate 41, may be used to maintain a substantially uniform cell gap between the attached array and color filter substrates 41 and 50, respectively.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A method of manufacturing a liquid crystal display device, comprising:
    forming an array substrate on an insulating substrate, comprising:
        forming a metal protection pattern at a peripheral region of the insulating substrate to protect corner regions from damage during a masking process;
        forming a main seal line to a predetermined thickness within an interior region of the array substrate, wherein the main seal line is spaced apart a first distance from the insulating substrate by at least one layer;
        forming a first auxiliary seal line between the main seal line and the metal protection pattern on the insulating substrate and to the predetermined thickness, wherein the first auxiliary seal line is spaced apart a second distance from the insulating substrate by at least one layer;
        forming a second auxiliary seal line parallel to and spaced apart from the first auxiliary line, wherein the second auxiliary line does not overlap the metal protection pattern;
        forming a third auxiliary seal line parallel to and spaced apart from the first and second auxiliary lines, wherein the third auxiliary seal line does not overlap the metal protection pattern; and
    attaching a color filter substrate to the array substrate,
    wherein the first auxiliary seal line does not overlap the metal protection pattern,
    wherein the first auxiliary line is spaced apart 8500 Å from the insulating substrate,
    wherein the first auxiliary seal line is formed on a protection layer, a gate insulating layer, and a gate electrode metal layer formed on the insulating substrate.

2. The manufacturing method of claim 1, wherein the first distance is greater than the second distance.

3. The manufacturing method of claim 1, wherein the first distance is substantially equal to the second distance.

4. The manufacturing method of claim 1, wherein forming the gate electrode metal layer includes forming the gate electrode metal layer at the interior region of the array substrate and at the peripheral region of the insulating substrate.

5. The manufacturing method of claim 1, wherein forming the array substrate further comprises:
    forming the gate electrode metal layer on the insulating substrate;
    forming the gate insulating layer on the gate electrode metal layer; and
    forming the protection layer on the gate insulating layer, wherein
    the main seal line is formed on the protection layer.

6. The manufacturing method of claim 5, wherein forming the gate electrode metal layer includes forming the gate electrode metal layer at the interior region of the array substrate and at the peripheral region of the insulating substrate.

7. The manufacturing method of claim 1, wherein attaching the color filter substrate comprises contacting the color filter substrate to the first auxiliary seal line.

* * * * *